[54] METHOD AND APPARATUS FOR MAINTAINING A PREDETERMINED PHASE RELATIONSHIP BETWEEN TWO SIGNALS

[75] Inventors: Victor Rodek, Rochester, N.Y.; Lauren V. Merritt, Sierra Madre, Calif.; Guillermo F. Luzio, Webster, N.Y.

[73] Assignee: Xerox Corporation, Stamford, Conn.

[22] Filed: Dec. 13, 1973

[21] Appl. No.: 424,529

[52] U.S. Cl. ...................... 355/50; 355/17; 355/77; 355/111

[51] Int. Cl. .......................................... G03b 27/48

[58] Field of Search ......... 355/14, 77, 50, 110, 111, 355/51, 17; 226/42, 111

[56] References Cited

UNITED STATES PATENTS

| | | | |
|---|---|---|---|
| 3,552,308 | 1/1931 | Minehart | 226/42 X |
| 3,576,367 | 4/1971 | Sable | 355/40 X |
| 3,677,637 | 7/1972 | Auken et al. | 355/14 X |
| 3,784,303 | 1/1974 | Sullivan et al. | 355/50 |

*Primary Examiner*—Richard L. Moses

[57] ABSTRACT

Method and apparatus for maintaining a predetermined phase relationship between signals representing the velocities of first and second movable members. The phase relationship between the two movable members is determined by comparing the velocity signals and generating a signal representing the phase relationship therebetween. A control signal related to said phase relationship is generated and is utilized to vary the velocity of one of the movable members so that a predetermined phase relationship is established for the signals. A portion of the control signal generated to reduce the phase error to zero for the frame being operated on is utilized to reduce the subsequent (next frame) phase error calculation to zero, thereby compensating for the fact that the velocity of the variable movable member is still being adjusted as the subsequent error calculation is being made.

17 Claims, 8 Drawing Figures

METHOD AND APPARATUS FOR MAINTAINING A PREDETERMINED PHASE RELATIONSHIP BETWEEN TWO SIGNALS

BACKGROUND OF THE INVENTION

The utilization of micromedia, for example, microfilm, for the storage of large volumes of data has become increasingly popular in recent years. However, the practical use and therefore the growth of such technique has been somewhat handicapped by problems associated with the retrieval and reproduction of the microfilm data in a readily usable manner.

One of the more recent technological innovations has been the utilization of microfilm to store the information generated by computers. The computer provides a visual output, for example on the screen of a cathode ray tube, which output is then photographed onto microfilm. Such computer generated information may comprise variable information, such as customer accounts. To achieve full utilization of the information stored on the microfilm, it is desirable to print such variable information onto forms having pre-printed information thereon. The pre-printed forms may comprise a business operations letterhead, distinctive logo or other similar type of non-varying information. It is obvious that it thence becomes necessary to transfer or print the variable prerecorded information from the microfilm onto the form so that the variable information is registered with appropriate portions of the pre-printed information. A final document is thus produced that may be readily circulated to achieve the desired information dissemination.

The availability of commercial machines for printing the variable information on microfilm in registration with pre-printed information has been extremely limited. In lieu of directly utilizing the microfilmed data, it has been the general practice to employ chain printers of the type well known to those familiar with computer and associated arts. The chain printers are driven by computer generated tape and operate to provide the final documents having the variable data printed in registration with the pre-printed information. However, the inherent speed deficiencies associated with a chain printer due to its line by line, intermittent paper feed, mode of operation has created the need for alternative printing means. However, to effectively compete with chain printers, such alternative means must have the attributes of being extremely reliable and relatively inexpensive to operate.

To obtain the above-mentioned machine specifications and to directly utilize the microfilm having the variable data photographed thereon, it has been proposed that a xerographic copying machine be employed. The microfilm having the variable data would function as the original document for copying purposes. A copy medium, preferably a web of paper, would have the pre-printed, non-variable information provided thereon.

To achieve the desired registration between the variable data and the non-variable data, it is thus necessary to synchronize the movement of the film relative to the copy medium so that the desired registration is obtained.

A synchronizing apparatus that has proven highly satisfactory in achieving the desired registration is disclosed in copending application, Ser. No. 254,131, filed May 17, 1972 now U.S. Pat. No. 3,768,904. The invention disclosed in the copending application obtains the desired synchronization by monitoring the speed of the filmstrip and the copy receiving medium and varying the velocity of the filmstrip to achieve a predetermined relationship with the velocity of the copy medium which is maintained constant. Registration marks are provided on the filmstrip and on the copy medium. Sensing mechanisms are provided to sense the passage of the registration marks through a sensing station and to generate control signals upon such occurrence. Such control signals are indicative of the respective velocities of the film and copy medium. Comparison means are provided to receive the signals and compare the phase relationship therebetween. Appropriate means are coupled to the comparison means for receiving a signal from the comparison means indicative of the phase relationship of the signals generated in response to the passage of the registration marks. The last mentioned means is further operable to vary the velocity of the filmstrip so that a predetermined phase relationship is established for the registration signals. A predetermined velocity relationship is thus established between the filmstrip and copy medium. In order to compensate for registration marks, particularly on the microfilm, which do not always fall in the same relative location from one roll of microfilm to the next, the signal representing the velocity of the copy receiving medium is delayed for a predetermined time period prior to being coupled to the comparison means.

Although the synchronizing apparatus described in the aforementioned copending application is highly satisfactory for its intended purpose, a more reliable and efficient system is desired to rapidly and accurately synchronize the film and copy mediums.

SUMMARY OF THE PRESENT INVENTION

It is an object of the present invention to provide method and apparatus for accurately and rapidly registering variable information contained on microfilm onto pre-printed information contained on a copy medium.

It is a further object of the present invention to provide improved method and apparatus for accurately and rapidly registering predetermined portions of a first high speed continuously moving web, movable at a controllable velocity, with predetermined portions of a second high speed continuously moving web movable at a constant velocity.

It is still a further object of the present invention to provide improved synchronizing apparatus having the capability of printing variable data from a microfilm strip onto pre-printed forms with precise registration of the variable data with the pre-printed information, regardless of any substantial variations in the location of registration marks on the film from one roll to the next or variations from one film frame to the next.

It is a further object of the present invention to provide method and apparatus for accurately and rapidly registering predetermined portions of a first high speed continuously moving web, movable at a controllable velocity, with predetermined portions of a second high speed continuously moving web movable at a constant velocity wherein the phase error is reduced to zero in approximately one film frame, the present phase error calculation being compensated for the adjustment in the variable web velocity in response to a preceding calculated phase error.

BRIEF DESCRIPTION OF THE DRAWINGS

For a better understanding of the invention, as well as other objects and further features thereof, reference is made to the following description which is to be read in conjunction with the following drawings wherein.

DESCRIPTION OF THE PREFERRED EMBODIMENT

Figure 1:
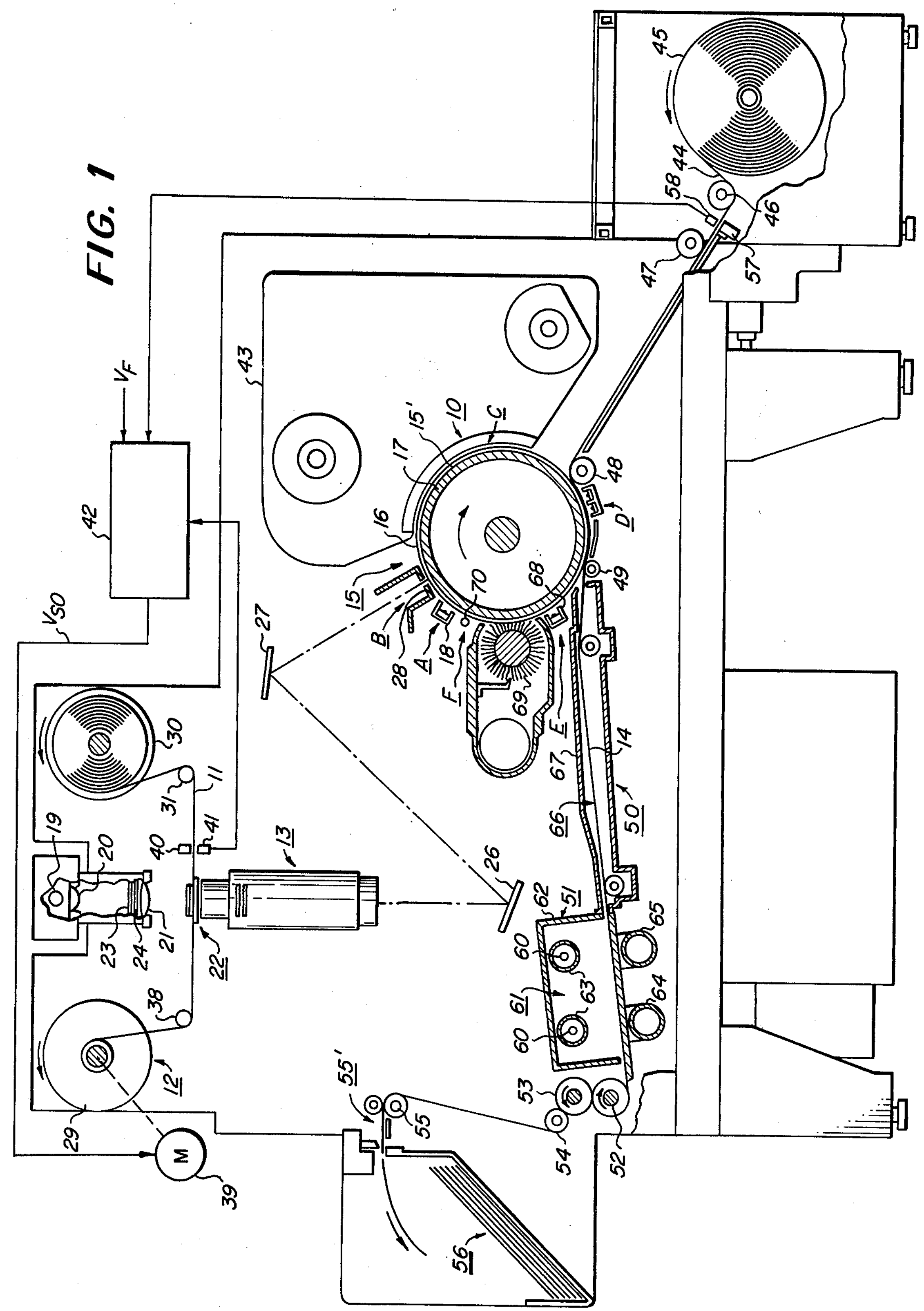
FIG. 1 is a schematic sectional illustration of a machine in which the present invention may be utilized.

Referring now to the drawings, FIG. 1 shows a system for reproducing information wherein the apparatus of the present invention may be employed. The system includes a xerographic machine 10, a filmstrip 11, a film transport 12, optical projecting means 13 and copy receiving medium 14.

Xerographic machine 10 includes a photosensitive member 15 which is driven about a shaft 15' by a motor not shown. Member 15 comprises a photoconductive insulating material 16, such as vitreous selenium overlaying an electrically conductive backing 17. The photoconductive insulating material is adapted, in the well known manner, to have an electrostatic charge applied to its surface and to selectively dissipate such electrostatic charge upon the exposure thereof to illumination corresponding to a light and dark pattern, such as an information pattern, whereupon an electrostatic latent image is formed on member 15. Although photosensitive member 15 is illustrated in a configuration of a drum, the member may take any convenient form such as an endless belt. The electrostatic charge is applied to the surface of member 15 by passing it under charging station A. The charging station includes any suitable means for placing a uniform electrostatic charge on the insulation material, such as a corona charging device 18.

As noted before, an electrostatic latent image of an original subject to be reproduced is formed via the selective dissipation of the charge on the surface of member 15. The selective charge dissipation is accomplished at exposing station B.

Exposing station B includes a source of light 19 capable of emitting light of the desired intensity, condenser lenses 20 and 21 which serve to conduct the light to an area of concentration disposed in the vicinity of film gate 22 and spectral and heat filters 23 and 24 which serve to filter the light passing to gate 22 so it has desired spectral and heat characteristics.

The images provided by the illumination of the original document at film gate 22 are projected, via optical projecting means 13, object mirror 26 and image mirror 27, to an exposure slit 28 at station B. Mirrors 26 and 27 are fixed in place at predetermined locations.

Optical projecting means 13 comprises at least one magnifying lens adapted to project images at a desired magnification ratio. As illustrated, optical projecting means comprises a zoom lens which provides infinite magnification ratios within a predetermined range.

The original document is preferably a filmstrip 11 comprising a web of microfilm, bearing images of information prerecorded thereon, and uniformly spaced sense markings distributed along the length thereof. The spaced sense markings are provided for a reason to be more fully explained hereinafter. Either negative or positive microfilm may be employed as the filmstrip.

The term "positive microfilm" refers to microfilm having opaque information images appearing on a transparent background. When positive microfilm is illuminated, and the image is projected onto the surface of member 15, the charge thereon is dissipated in areas equivalent to the transparent non-information bearing portions of the microfilm. The charge remaining on the surface of member 15 is equivalent to the opaque, information portions of the microfilm.

If negative microfilm is employed, the reverse operation occurs. As used herein, the term "negative microfilm" refers to microfilm having transparent information areas appearing on an opaque background. When negative microfilm is illuminated and the image is projected onto the surface of member 15, the charge thereon is dissipated in areas equivalent to the transparent information portions of the microfilm. The charge remaining on the surface of member 15 is equivalent to the opaque non-information portions of the microfilm.

Filmstrip 11 is adapted to be transported from supply reel 30 over guide roll 31 normal to film gate 22 and over guide roll 38 and on to take-up reel 29. Take-up reel 29 is mechanically coupled to electric motor 39 as shown. A separate motor (not shown) is employed to drive reel 30. A lamp 40 or other source of light is fixedly disposed relative to filmstrip 11 and is in optical communication with a photocell means 41. Photocell means 41 and lamp 40 combine to sense the passage of the spaced sense markings on the filmstrip and to generate a signal in response thereto. The signal is transmitted to a synchronizing apparatus 42 to be more fully explained hereinafter.

It should be noted that a third signal, $V_F$, is supplied to synchronizer apparatus 42. This signal corresponds to the nominal speed of filmstrip 11 and, as will be explained hereinafter, is directly related to the magnification ratios selected by the machine operator. The signal $V_F$ may be generated in a manner shown in FIG. 1*a*.

The operator, after selecting a particular magnification ratio, will turn a shaft 80 (on the machine panel) in accordance therewith. Shaft 80 is coupled via a toothed belt 82, to the barrel 84 of zoom lens 13 and to shaft 86, which controls the tap 88 of potentiometer 90.

The rotation of shaft 80 causes belt 82 to move in a corresponding linear direction whereby the zoom lens barrel 84 is rotated, causing the magnification ratio to be adjusted to the selected value and rotates shaft 86 in a manner whereby tap 88 is correspondingly positioned to generate the signal $V_F$. When the filmstrip 11 and paper web 44 are in synchronization, the synchronizer output signal causes motor 39 to drive the filmstrip 11 at a speed related to the selected magnification ratio. A zoom lens assembly which may be utilized in the present invention is described in co-pending application Ser. No. 408,777, filed Oct. 23, 1973, in the names of Harold F. Bennett and Wai-Min Liu, and assigned to the assignee of the present invention.

Xerographic machine 10 further includes a developing station C. Developing station C includes developing means 43 which may comprise any well-known form of electrophotographic development apparatus which acts to develop an electrostatic latent image by the application of developer material. The developer material comprises carrier granules and toner particles. The toner particles adhere to the latent image on the surface of member 15 thereby developing the image. The developing means 43 illustrated in FIG. 1 is of the cascade type. Cascade development is well-known in the electrophotographic arts and no further elaboration thereon is deemed necessary.

Following image development, the next step in the typical xerographic process is the transfer step which is accomplished at transfer station D. The image is transferred from photosensitive member 15 to the copy receiving medium 14 which is preferably a web of paper 44. Web 44 is adapted to be transported from supply roll 45 over guide rolls 46, 47, and 48, through transfer station D, over guide roll 49 and through attenuator 50 and fusing means 51. The paper thence passes into the nip of drive rollers 52 and 53 and passes over guides 54 and 55 and is thence cut to predetermined lengths via guillotine blade 55'. The final documents are then stacked in stacker 56. It should be noted that the paper web 44 may be of the fan-fold type. If this is the situation, guillotine blade 55' is not required and stacker 56 will be reconfigured to allow the paper web to refold as it exits from fuser 51.

Fuser 51 provided for fixing the toner to the paper web is of the type known to those skilled in the art as a "flash fuser". Flash fuser 51 comprises a plurality of elongated generally tubular sources of radiant energy 60 supported within a generally rectangular cavity 61 defined by frame member 62. The sources of radiant energy are capable of emitting energy wavelengths at which the web is essentially non-absorbant and at which the toner particles forming the image are highly absorbant. A xenon arc lamp may be employed as the source of radiant energy.

A glass tube 63 encapsulates each of the energy sources 60. A blower means (not shown) provides a continuous supply of cool air, via ducts 64 and 65 between the inner surface of glass tubes 63 and the outer surface of the sources of radiant energy. The cool air is supplied to prevent the xenon lamps from becoming overheated during their prolonged use.

As is illustrated, the web of paper is moved through the cavity transversely to the axes of energy sources 60. The sources 60 are pulsed for a predetermined period of time at predetermined intervals. The toner particles adhering to the web absorb the radiant energy thus produced and are thereby affixed to the web. It should be understood that other forms of fixing devices, such as heat fixing, or combinations of heat and pressure fixing devices, may be employed in lieu of the illustrated flash fuser. Such alternative fusing devices are well known to those skilled in the art. If a more detailed description of a flash fusing device is desired, reference may be had to U.S. Pat. No. 3,529,129.

An attenuator 50 is disposed between fuser 51 and photoconductive member 15. The web of paper passes through a cavity 66 defined by the frame member 67 of the attenuator. Attenuator 50 is provided to prevent the transmission of any radiant energy from fuser 51 to the surface of photoconductive member 15.

For a more detailed explanation of attenuator 50, reference may be had to copending patent application, Ser. No. 250,636, filed May 5, 1972.

Lamp means 57 is fixedly disposed along the path of travel of web 44. The lamp is in optical communication with a photocell 58. Lamp 57 and photocell 58 cooperate to generate a signal upon the passage of uniformly spaced sense markings which are provided along the length of web 44. The signal thus generated by the passage of the markings is indicative of the velocity of the web. The velocity signals are transmitted to synchronizer apparatus 42.

In addition to the sense markings, the web has preprinted information thereon. Such information may include appropriate headings, columns and the like, wherein it is desired to print the variable information recorded on filmstrip 11 in registration with appropriate portions of the pre-printed information on the web.

To complete the xerographic process, the photoconductive member moves through a cleaning station E and an erase station F before completing the cycle.

Cleaning station E includes a pre-clean corotron 68 which provides a charge, to neutralize the charge holding any untransferred toner onto the surface of member 15.

After passing under the pre-clean corotron, the surface of member 15 is then brushed by rapidly rotating brush 69 to remove any remaining toner from the surface of the photoconductive member.

Subsequent to the brushing step, the member passes under a source of light 70 which provides light energy to affectively dissipate any remaining charge on the photoconductive member's surface. The member is then ready to start a new cycle by being exposed to the charging corotron 18. Any of the known equivalents of process or apparatus elements may be employed in connection with the present invention without departing from the spirit thereof.

Figure 2:
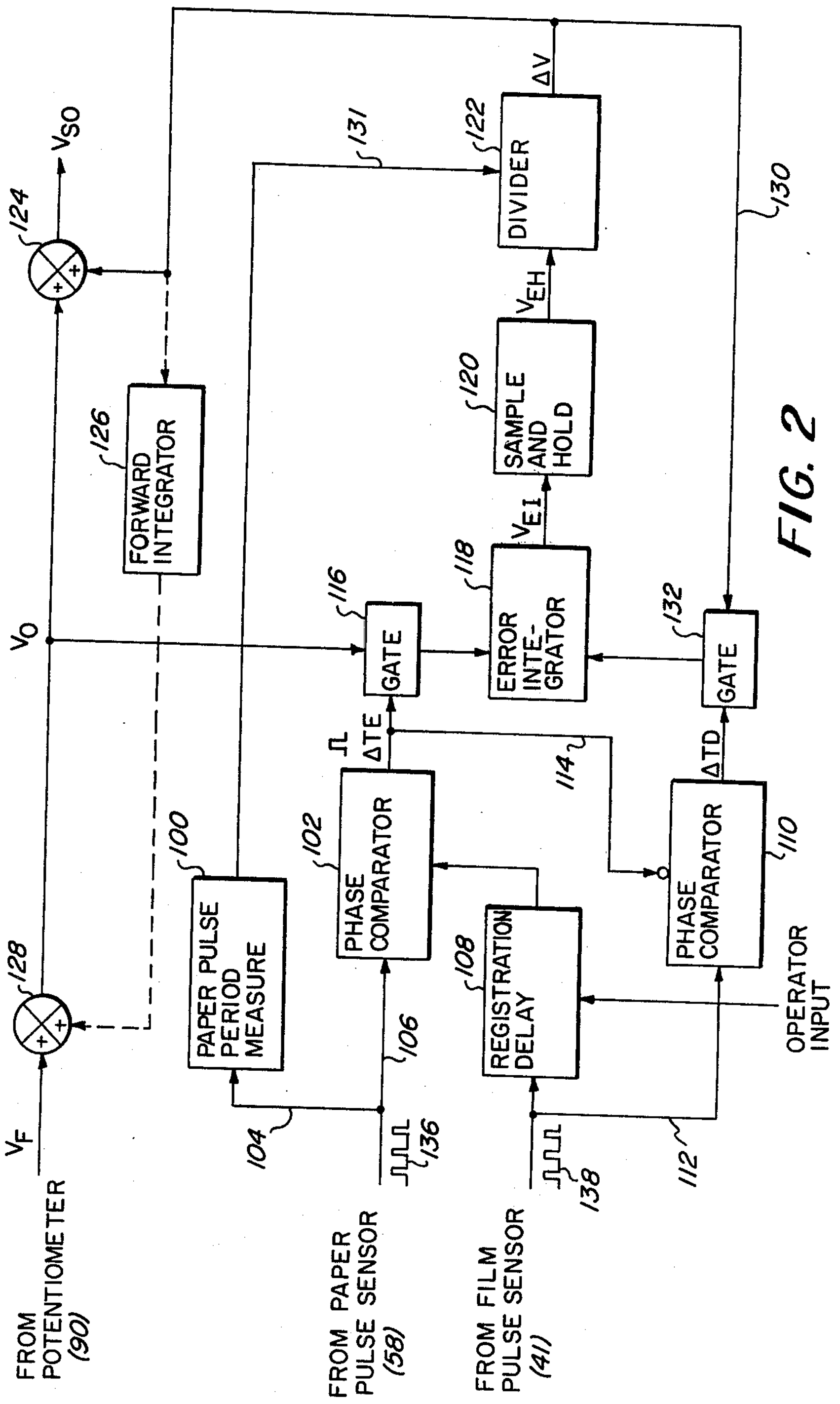
FIG. 2 is a block diagram of a synchronizing apparatus including the invention herein disclosed.

Now referring to FIG. 2, there is illustrated a block diagram of an embodiment of synchronizing apparatus 42. As discussed hereinabove, the speed of filmstrip 11 is controllable, whereas the speed of web 44 is maintained constant. Thus, the synchronizer functions to vary the speed of the filmstrip so that the variable information provided on the filmstrip is printed in registration with appropriate portions of the pre-printed information on the web.

The pulses generated by the paper sensor 58 (FIG. 1) are transmitted directly to paper pulse period measure means 100 and phase comparator 102 via leads 104 and 106, respectively. The pulses generated by film sensor 41 are coupled to phase comparator 102 via registration delay means 108. The registration delay means 108 enables the apparatus to compensate for film marks located in different positions on different rolls of film. To get the images lined up correctly, the film marks have to be delayed a discrete amount of time before the error comparison is made, that is, the synchronizer does not necessarily serve to force the film pulse to coincide in time with the paper pulses, but rather it serves to force the delayed film pulses to coincide in time with the paper pulses. The amount of registration delay is set by the operator for proper image registration and is determined by the relative position of the pulse mark on the film frame. The output of the film sensor is also coupled to phase comparator 110 via lead 112. The output of phase comparator 102, $\Delta TE$, is coupled to the phase comparator 110 via lead 114. The output $\Delta TE$ is coupled to error integrator 118 via gate 116. The other input to gate 116 is signal $V_O$ which corresponds to the nominal speed of film 11. The output $V_{EI}$ of error integrator 118 is sampled and held by sample and hold circuit 120. The output VEH of sample and hold circuit 120 is applied to a digital divider 122, the other input of which is coupled to paper pulse period measure 100. The output of the divider 122, $\Delta V$, corresponds to the speed correction necessary to bring the film 11 into synchronization in one frame period to correct the film position error which was detected. The frame period is defined as the output of the paper pulse period measure means 100. This speed error is applied to summer 124 wherein the speed correction is added to the nominal speed $V_O$ of film member 11, the resultant signal $V_{SO}$ being applied to motor 39, film 11 and paper web 44 thereby being brought into synchronization. The output $\Delta V$ is also applied to what is termed forward integrator 126, the output of which is coupled to summer 128. The forward integrator 126 provides a bandwidth controlled high gain and allows for correction of system errors, such as initial errors in the zoom lens assembly generated signal $V_F$ and film transport gain errors and enables $\Delta TE$ to be driven to zero if the aforementioned errors are present. The other input to summer 128, $V_F$, corresponds to the selected magnification ratio described hereinabove. The output of summer 128, corresponding to signal $V_O$, is fed to adder 124 and gate 116 as shown. The correction signal $\Delta V$ is coupled to error integrator 118 via lead 130 and gate 132. The other input to gate 132, $\Delta TD$, is supplied from phase comparator 110.

As set forth previously, the xerographic machine described with reference to FIG. 1 prints on paper from photographic film. The paper and film, while flowing continuously, do so at different speeds. The ratio of their speeds is necessarily the inverse of the optical magnification so that the projected film image on the paper is stationary in relation to the paper. Since the paper speed is fixed by the processor, the film speed must be adjusted as the optical magnification is changed. Thus, an electrical signal $V_F$ is generated by the zoom lens assembly that varies inversely with magnification. As shown in the block diagram, this signal may also be used by the film transport mechanism as a speed reference. The importance of the synchronizer, as explained previously, arises when a film frame image must be copied in a precise location with respect to the film format preprinted on the paper. Image registration is of primary importance whereas actual film speed is a secondary consideration. In order to make image registration possible, there are registration marks on both the film and paper. Signals from sensors 41 and 58 are processed by the synchronizer, the results being utilized to modify the signal $V_F$ from the zoom lens assembly as explained hereinafter. The inputs to the synchronizing system are pulse trains 136 and 138, corresponding to the paper and film registration marks, respectively, and the signal $V_F$ from the zoom lens assembly which is proportional to the selected magnification ratio. The film pulse is delayed by registration delay means 108, the actual delay being preset by the machine operator for correct film image to paper form registration as explained hereinabove.

The delayed film pulse and the paper pulse are phase compared in phase comparator 102, and an error time $\Delta TE$ is detected. This is integrated with respect to the local film velocity reference, $V_O$, in error integrator 118 resulting in a voltage proportional to the film position error $V_{EI}$. When $\Delta TE$ ends, the contents of the error integrator is the error distance $V_{EI}$. $V_{EI}$ is stored as $V_{EH}$ by sample and hold circuit 120, allowing the error integrator 118 to be reset and thus available for the next error computation. Thus, the voltage $V_{EH}$ is the result of the last error integrator calculation and allows the error integrator to make a new error calculation while the film transport continues to operate on the last error computation.

The sample and hold system following the actual computed error allows the film transport to be undisturbed while an error calculation is being made, the film transport having a discrete speed change made thereto after the error calculation has been made. When the sample and hold circuit has sampled the error integrator, the error integrator is then reset and is ready for the next error calculation.

The sample and hold circuit block 120 now holds the distance error $V_{EH}$. $V_{EH}$ is next divided by the paper period, the paper period having been measured in block 100, resulting in $\Delta V$, a velocity change that is required so that the film speed will change sufficiently so that at the next time the paper pulse occurs the time error should be zero. This velocity correction is summed with $V_O$ in summer 124 to provide the synchronizer output $V_{SO}$. $\Delta V$ is also integrated by forward integrator 126 and summed with $V_F$ in summer 128 to generate $V_O$. $V_O$ is thus adjusted to compensate for initial synchronizer system errors and is continually updated for film and system drifts.

The forward integrator 126 and the input and output leads associated therewith are indicated in phantom to indicate that in an idealized system (without system offsets), the integrator is not necessary. In the preferred embodiment which takes notes of the fact that system offsets are usual, the integrator is included in the system. The forward integrator 126 allows for compensation of system offsets and enables $\Delta V$ and $\Delta TE$ to be driven to zero.

At the end of an error calculation when $V_{EH}$ and $\Delta V$ go to a new value, the film transport changes speed; and at the end of the next error calculation the error should be zero. However, if the registration delay circuit 108 has a significant time delay and responds to the next film pulse, the film transport has not had time to make the correction that $\Delta V$ requires. For example, if the registration delay is 50 percent of the frame and $\Delta V$ indicates a 1 percent speed change is required, the amount of film position error that has been corrected when the next film pulse is picked up is only 50 percent (or 0.5 percent net correction) of what it should be. Thus, the next error calculation would indicate half as much error as calculated previously, yet by the time that error calculation is finished, the film is in the correct position. For this reason, a feedback loop comprising gate 132 and phase comparator 110 is provided.

The $\Delta TE$ pulse is inverted and phase compared with the film pulse in phase comparator 110 and a time delay $\Delta TD$ is detected. $\Delta TD$ is the delay time between arrival of the film pulse and application of the next error calculation to the output. This is integrated with respect to the previous $\Delta V$ computation in error integrator 118 resulting in a voltage proportional to the amount of error correction done during the time between arrival of the film pulse and the application of a new $\Delta V$ to the synchronizer's output (i.e., a new error calculation has been completed). The feedback loop controls the summation of ΔV back into the error integrator 118 which allows compensation therein for the error being corrected while the registration delay means 108 is cycling. The ΔV . ΔTD integration and the ΔTE . $V_0$ integration are performed in error integrator 118, with different polarities being utilized. Thus the two integrations will total zero if the error time ΔTE, relative to $V_0$, is corrected during time ΔTD due to the ΔV velocity correction of the previous error computation cycle.

$V_0$ . ΔTE is the present measured error while ΔTD . ΔV is the remnant of the last attempted error correction. Therefore, as $V_{EI}$ = ΔTE . $V_0$ − ΔTD . ΔV, when $V_{EI}$ goes to zero the present measured error equals the remnant of the last attempted error correction.

The film velocity correction is applied uniformly over an entire length, since the correction is applied as soon as the last pulse occurs.

Figure 3:
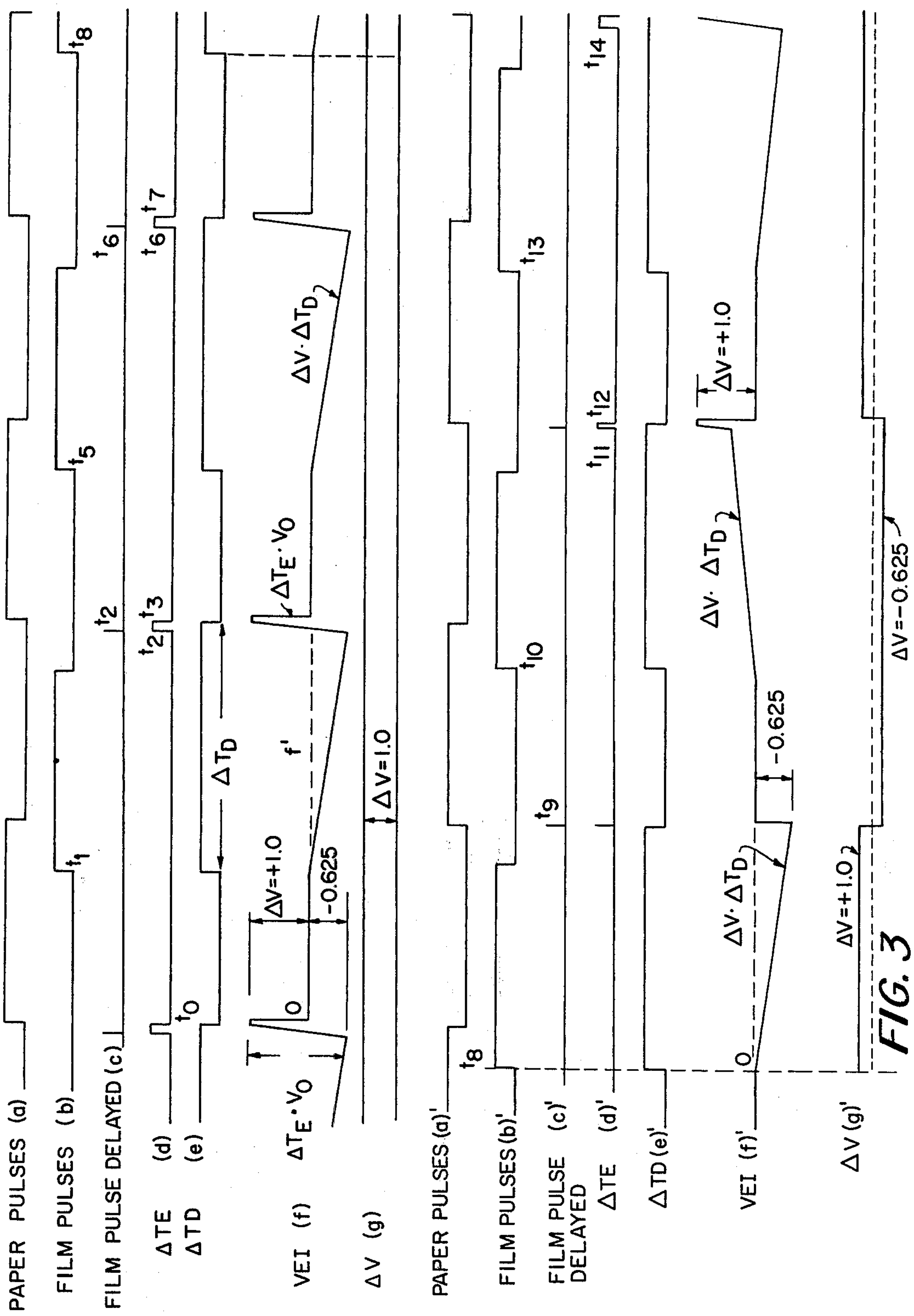
FIG. 3 illustrates representations of control signals generated by the synchronizing apparatus disclosed in FIG. 2.

FIG. 3 illustrates the signals generated at various points within the block diagram shown in FIG. 2. Waveforms (a) and (b) illustrate typical pulse trains generated by the paper and film sensors, respectively. Waveform (c) is the delayed film pulse train, and in the case illustrated, the delayed film pulse leads the paper pulse. Waveform (d) illustrates the phase error ΔTE represented by a pulse having a width proportional to the phase error in time. Waveform (e) represents the phase error between the inverted signal ΔTE and the film pulse signal. As can be seen, ΔTD is of a width which includes ΔTE in the trailing edge thereof. Waveform (f), represents $V_{EI}$ and shows the cycling of the error integrator as it computes what will become the correction signal ΔV. Waveform (g) corresponds to the correction signal ΔV, a positive ΔV slowing down the film.

Referring to waveform 3(*d*), $t_0$ represents the termination of an error calculation time. At time $t_1$, a new film pulse is received and while the registration delay means is cycling, the error integrator 118 is commencing a new $V_{EI}$ calculation, the immediate calculation being concerned about the amount that the film is going to move while the registration delay is cycling. Thus, waveform 3(*f*) illustrates that $V_{EI}$ is, after an initial positive pulse portion proportional to the integration of ΔTE · $V_0$ before $t_0$ and a negative step portion (proportional to ΔV) as it is reset, is in a negative direction as the error integrator integrates ΔV · ΔTD. For example, if the speed of the film is changed one unit of velocity in response to the error correction signal ΔV, it is only able to do that for a portion of the frame time before the new film pulse enters into the registration delay means 108 so that by time $t_2$ the film position measured at $t_1$ is no longer a true representation of where the film is at $t_2$. However, error integrator 118 determines where the film in fact really is by doing the ΔTD computation (ΔV . ΔTD) during $t_1$ to $t_3$.

At time $t_2$, the next delayed film pulse initiates the ΔTE error calculation, ΔTE being the difference between $t_2$ and $t_3$. The ΔTE calculation is made with respect to $V_0$, the nominal film speed. The net result at $t_3$ is the new error distance that the film must move over the coming frame duly compensated for the error correction that was made during the last frame.

Note that if no phase error is detected between $t_2$ and $t_3$ and the prior ΔV. ΔTD calculation is zero, the $V_{EI}$ curve will take the form of dotted line *f'*. Further, if the delayed film pulse lags the paper pulse, the $V_{EI}$ curve would be inverted. It should be noted that the FIG. 3 timing diagram has been plotted with the assumption that a zoom lens potentiometer error is present and that the forward integrator 126 is not present in the circuit. For this condition, the ΔV computation at $t_0$, $t_3$ and $t_7$ are identical, $t_6$ corresponds to $t_2$; $t_5$ corresponds to $t_1$. Note that the assumed zoom lens potentiometer error generates an erroneous speed reference signal $V_F$ which translates into a proportional offset between the paper pulses and the delayed film pulses. If the forward integrator 126 was operating, ΔTE would be in fact gradually driven to zero over several frames, but the waveforms shown (particularly 3(*f*)) would not be informative. However, phase errors may still be present notwithstanding the presence of the forward integrator due to frame-to-frame non-uniformities in the film.

The waveforms in the lower half of FIG. 3, labeled (*a*)'–(*g*)', illustrate the situation when the rise in the film pulse at $t_8$ occurred late with respect to its prior cycles. Note that $t_8$ is the correspondence between the top half of the figure and the bottom half of the figure which is then a folded-over time chart. With $t_8$ being delayed, $t_9$ is also delayed, and the waveform is shown whereby ΔTE is reduced to zero. No sharp rise (equivalent to the ΔTE . $\Delta V_0$ calculation) is therefore observed in FIG. 3(*f*)'. This was chosen, for illustrative purposes, so that ΔTE at time $t_9$ is zero. Thus, the computation of ΔV at time $t_9$ is merely due to the ΔV · ΔTD integration being performed between $t_8$ and $t_9$. $V_{EI}$, as will be explained in detail hereinafter, is reset to zero each time an error computation is completed. There is a slight delay as $V_{EI}$ is shifted into the sample and hold circuit, and then to the divider 122 to form a constant ΔV throughout a frame. While ΔV is being held constant, $V_{EI}$ has been reset and is available for doing a new computation. At time $t_9$ $V_{EI}$ reaches a magnitude of 0.625, since the registration delay time ΔTD has been arbitrarily selected to be 62.5 percent of the frame. Referring to the upper half of FIG. 3 to exemplify this, for a given ΔV correction, only 37.5 percent of that correction has been done by time $t_1$. By time $t_3$, the end of an error time calculation, the film is in a significantly different place that it was at time $t_1$. AT time $t_2$, ΔV . ΔTD has decreased to 0.625 assuming an arbitrary magnitude of 1 for ΔV. ΔTE must be large enough with respect to $V_0$ to return $V_{EI}$ to +1 from −0.625 in order to attain the proper value for ΔV. Referring back to the lower half of the figure, at time slightly greater than $t_9$, $V_{EI}$ has been reset to 0, ΔV having been switched to its new negative value as shown in FIG. ΔV(*g*)'. At time $t_{10}$, a new film pulse arrives, initiating the cycling of the registration time delay circuit. The ΔV . ΔTD integration goes in a positive slope. ΔV is negative, while in the previous cycle the ΔV . ΔTD slope was negative, ΔV being positive. During the time period between $t_9$ and $t_{10}$, the negative ΔV causes the film to speed up and tends to bring the phase error ΔTE to its assumed system value. The phase error detected between $t_{11}$ and $t_{12}$ is calculated as previously, i.e., ΔTE . $V_0$, and added to the ΔV . ΔTD calculation. At time $t_{12}$, the $V_{EI}$ integration is reset and conditioned to receive the ΔV . ΔTD calculation initiated at $t_{13}$, a negative ramp slope being calculated. The film pulse at $t_{13}$ is delayed as shown and by $t_{14}$, the system ΔTE has been reacquired. It should be noted that the scaling factor of 1 and 0.625 on ΔV are arbitrary and their proportion is based on the assumption that a 62.5 percent registration delay has been selected.

Figures 1A, 4D:
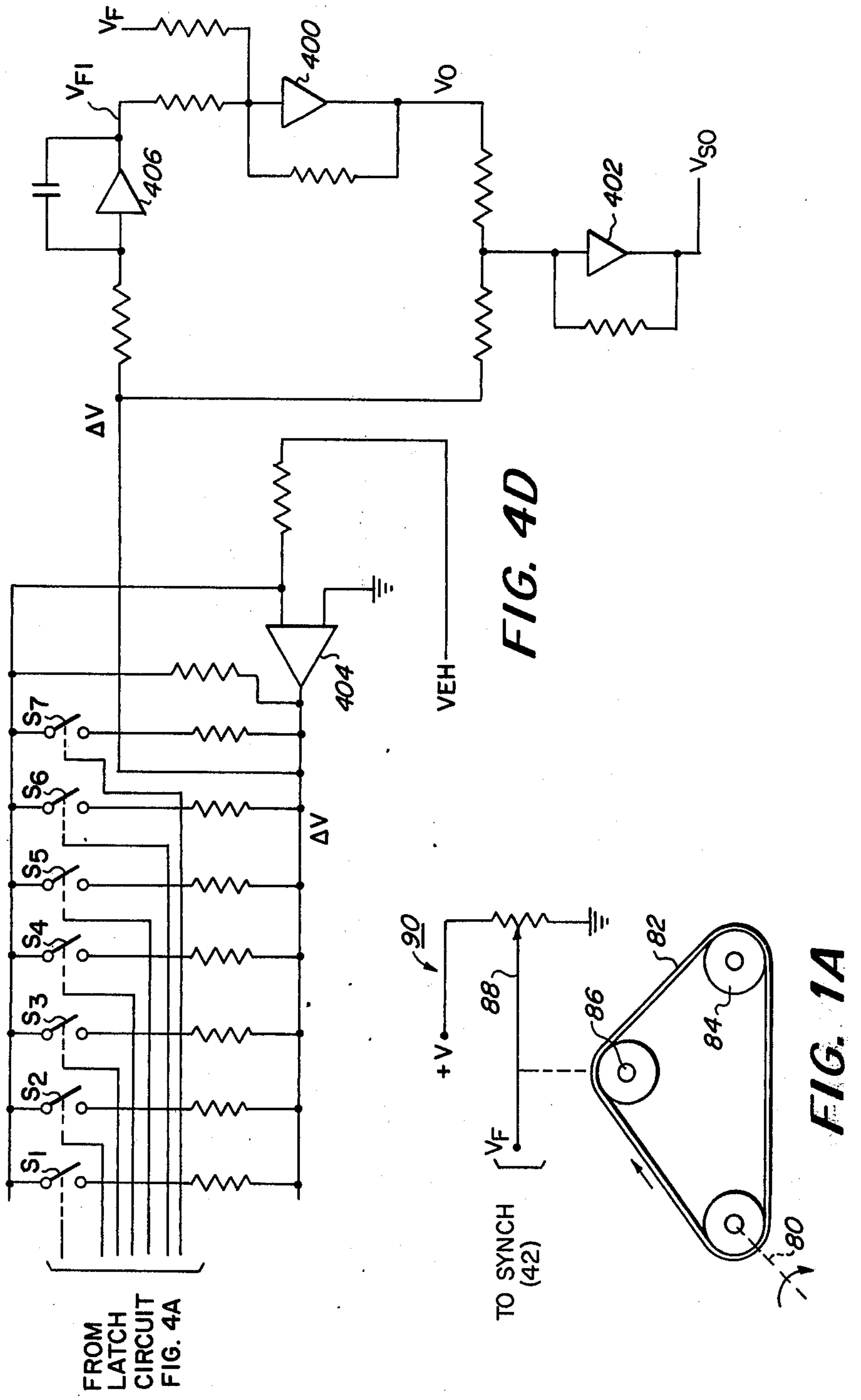
FIG. 1*a* is a schematic of apparatus utilized to generate a velocity control signal utilized in the system shown in FIG. 1.
FIGS. 4A–4D is the schematic diagram of the block diagram illustrated in FIG. 2.
Figure 4A:
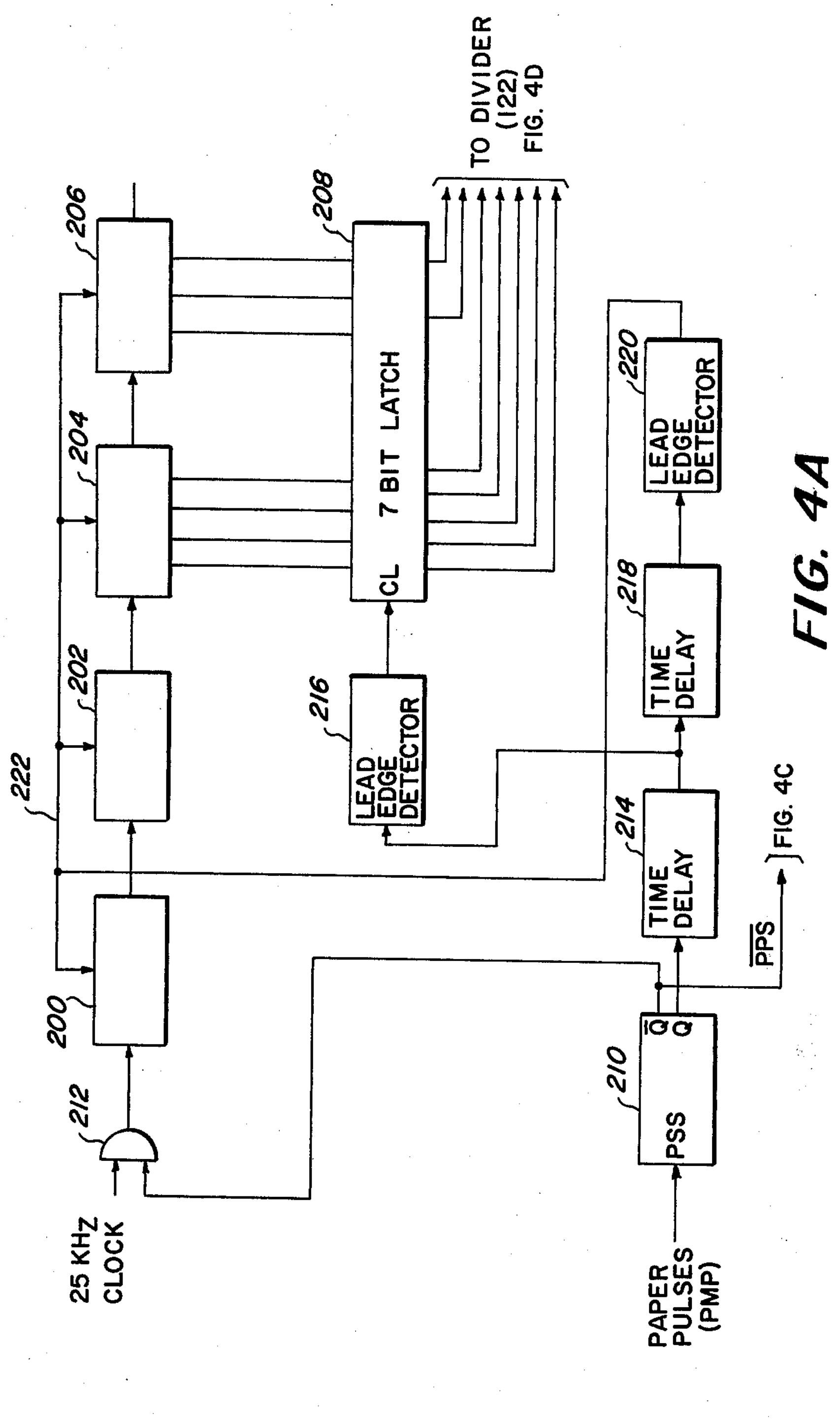

Referring now to FIGS. 4A–4D, a schematic diagram of the FIG. 2 block diagram is illustrated. The paper pulse measure circuit 100 is shown in FIG. 4A and comprises counters 200, 202, 204 and 206 operating from a 25KC clock, being measured such that the circuitry is operative continuously. Whenever a paper pulse is received, its count status is recorded in a 7 bit latch circuit 208 which provides a digital output which corresponds to the measured paper pulse period.

Operationally, a paper pulse (PMP) is detected by a paper single shot (PSS) 210. The $\overline{Q}$ output of single shot 210 is coupled to AND gate 212 and acts to inhibit the clock circuit, dividers 200, 202, 204 and 206 no longer being operative. The Q output of single shot 210 is delayed in delay circuit 214 (to allow the clock to be thoroughly inhibited), the leading edge of the delayed pulse appearing at the output of delay circuit 214 being coupled to lead edge detector circuit 216 which in response thereto generates an output pulse. The output pulse generated by lead edge detector circuit 216 operates to cycle the clock line (CL) of latch 208 so that the contents of counters 204 and 206 (which correspond to the measured paper pulse period) are stored in latch circuit 208. The output of time delay circuit 214 is also coupled to time delay circuit 218, the output thereof being coupled to lead edge detector 220. The output of lead edge detector 220, a pulse delayed in time longer than the pulse connected to detector 216, is coupled to the paper reset line 222 whereby all the counters are reset to zero. After the paper single shot 210 relaxes, the clock is again enabled and the counter circuit becomes operative. The output of the latch circuit is coupled to the divider network 122 shown in FIG. 4D.

Figure 4B:
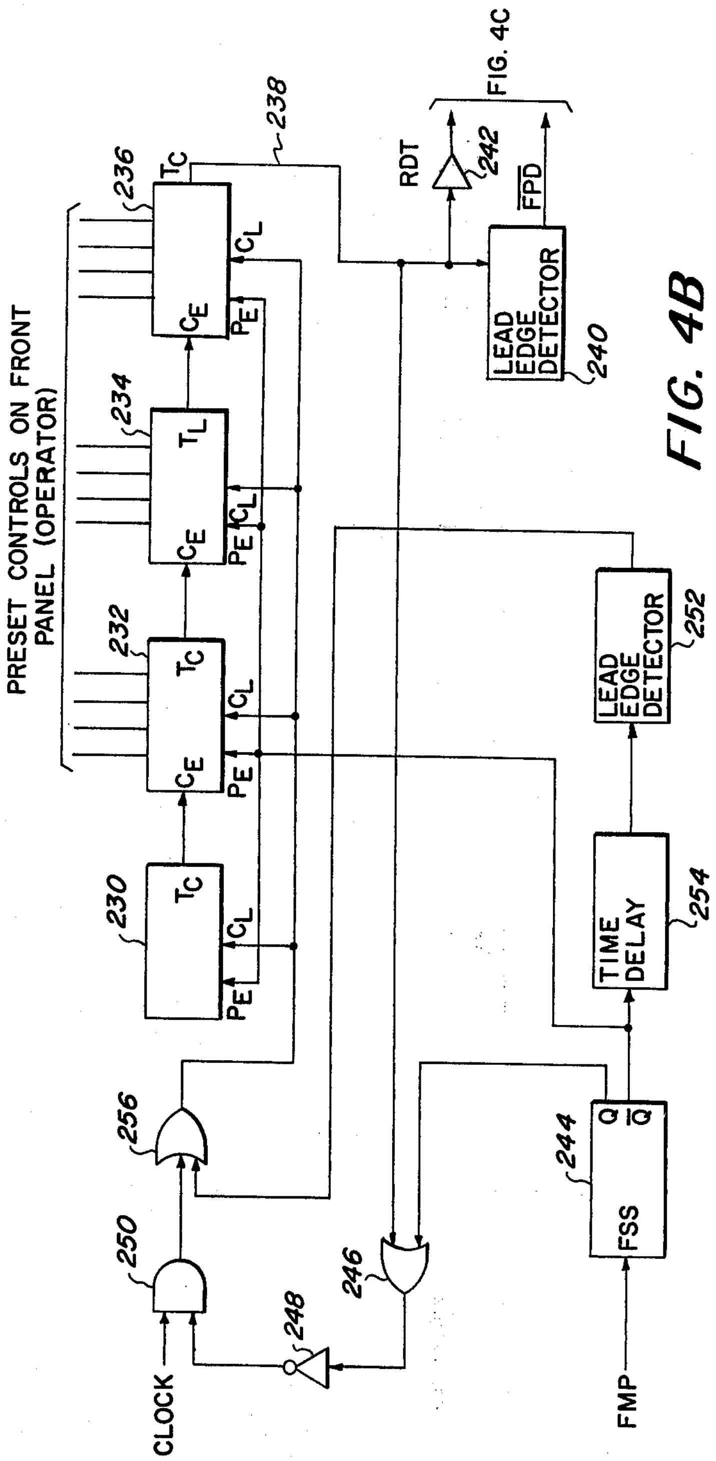

Referring now to FIG. 4B, the schematic diagram of registration delay circuit 108 (FIG. 2) is illustrated. The registration delay circuit generates an output pulse a predetermined period of time after the arrival of the detected film pulse. This is done by counting pulses from a reference clock; the arrival of an input pulse allows a chain of counters to generate an output after counting the required number of reference clock pulses. The counters are organized to accept parallel encoded data when the input pulse arrives and then count until they are full. The particular counter organization described requires that the input data be the complement of the required delay although other counter arrangements may be utilized. The divider chain comprises dividers 230, 232, 234 and 236 (divided by 16, 10, 10 and 16, respectively). In order to select a desired registration delay a machine operator presets counters 232, 234 and 236 in accordance with the desired delay. The divider counter chain operates in a standard manner, i.e., when each counter reaches its peak capacity, a pulse output is transmitted to the succeeding counter. When counter 236 reaches its peak capacity, line 238 (TC, or terminal count) comes high. The output on line 238 is coupled to lead edge detector 240 which generates the delayed film pulse signal $\overline{FPD}$. Buffer 242 provides the signal RDT, or registration delay time, which will be high whenever a film pulse is being delayed. With the terminal count line 238 high, indicating that the desired film pulse delay has been accomplished, it is desired to inhibit the 25KC clock. This is accomplished as follows: When a film mark pulse (FMP) is detected, film single shot 244 is triggered. The Q output goes high and is fed into OR gate 246, the other input thereto being the output on terminal count line 238. The output of OR gate 246 is connected to inverter 248, the output thereof being coupled to AND gate 250. This maintains the clock inhibited so long as the film single shot 244 is high. The $\overline{Q}$ output of the film single shot 244 pulls the parallel enable line (PE) down (standard counter mode of operation) so that a single clock pulse will allow the parallel entry of the data from the front panel switches. This actual data entry is accomplished by lead edge detector 252 that receives the $\overline{Q}$ output of film single shot 244 time delayed by time delay circuit 254. The lead edge detector 252 applies a clock pulse into the clock circuit via OR gate 256 allowing the parallel transfer to occur. After the parallel transfer is accomplished, film single shot 244 cycles out and the clock circuit is again enabled. Note that the film clock line drives all the counters in parallel and an individual counter will operate when the terminal count of the previous counter enables the count enable line of the following counter. Parallel entry operation is accomplished on the other hand, when the clock line cycles and the parallel enable line is low as explained hereinabove.

The circuits shown in FIGS. 4A and 4B have been described in a sufficient manner whereby one of skill in the art would be able to provide a pulse measuring circuit and a registration delay circuit by using standard logic design techniques. Obviously, many alternate techniques may be provided.

Figure 4C:
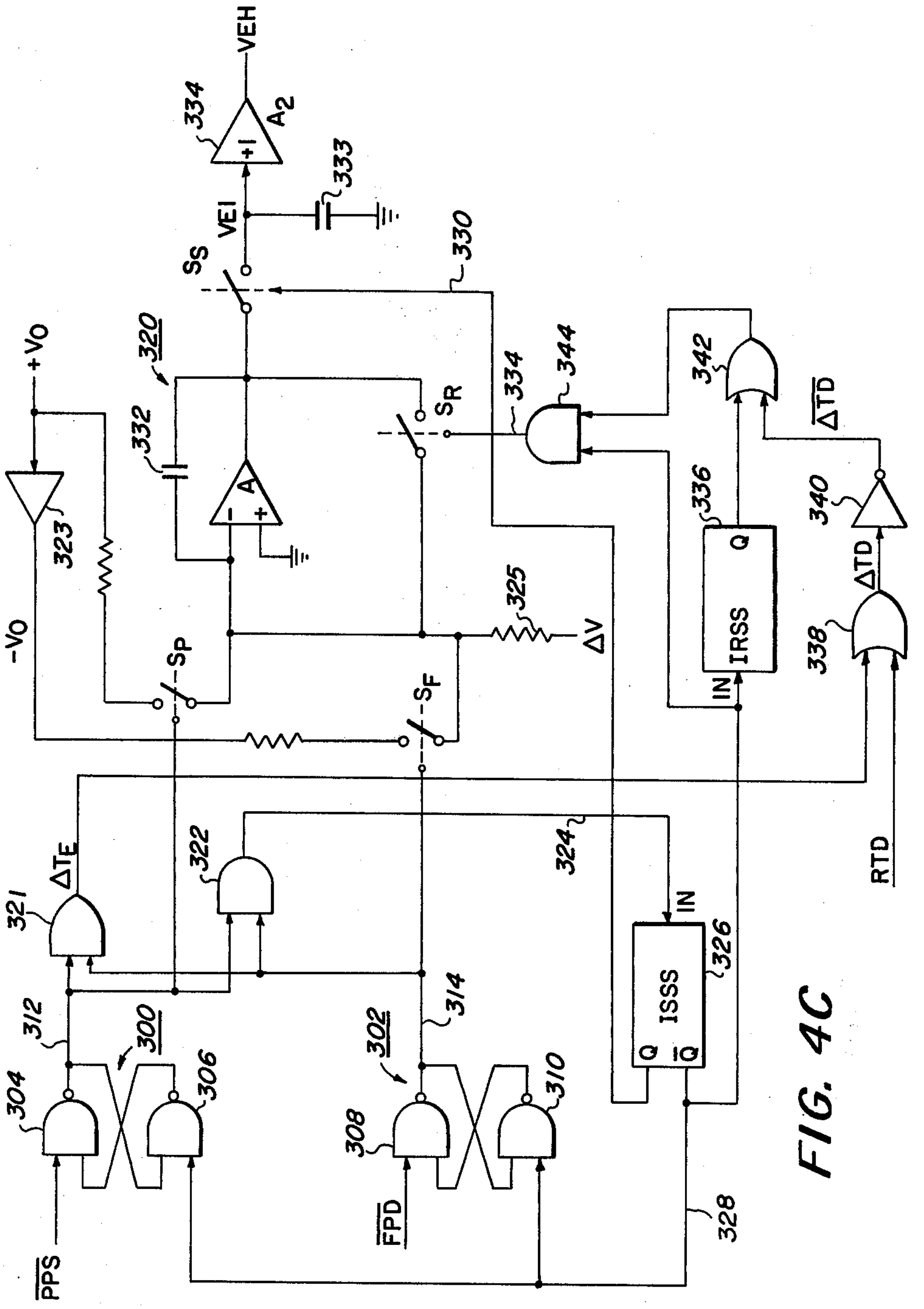

Referring now to FIG. 4C, the signals $\overline{PPS}$ and $\overline{FPD}$ (paper pulse shaped and film pulse shaped respectively) drive flip-flops 300 and 302, respectively. Flip-flop 300 comprises NAND gates 304 and 306, cross-connected in the standard manner and flip-flop 302 comprises NAND gates 308 and 310 similarly cross-connected. If either of the flip-flops are true (i.e., logic 1 on lead 312 or 314, respectively), their corresponding switches (SP and SF, respectively) close and the error integrator 320 (118 in FIG. 2) operates on either $+V_0$ or $-V_0$ ($+V_0$ if switch SP is closed), $+V_0$ being supplied from a constant potential source (not shown), inverter 323 inverting $+V_0$ to provide $-V_0$ as shown. Thus, if the paper pulse arrives first, the signal $\overline{PPS}$ is immediately generated, the paper flip-flop 300 is set, the paper switch SP turns on, and $+V_0$ is fed into the error integrator 320 which generates a negative ramp signal at the output thereof. When both flip-flop 300 and 302 are set (i.e., the delayed film pulse $\overline{FPD}$ is present at the input of NAND gate 308), the inputs to AND gate 322 are high, and a signal is generated on lead 324 which triggers the integrator sample single shot 326. The single shot 326 resets both the film and the paper flip-flops 300 and 302 by generating a signal on lead 328 (at the $\overline{Q}$ output), causing switches SP or SF to open, thus inhibiting the integration sequence of error integrator 320. The signal at the Q output of single shot 326 drives the error integrator sample line 330 which closes the sample switch $S_s$. Capacitor 333, operating as a sample and hold capacitor, charges to the voltage on capacitor 332. The voltage on capacitor 333, buffered by amplifier 334, appears at the output thereof as $V_{EH}$. The computation cycle is essentially completed at this time.

The integrator sample single shot 326 inhibits the error integrator reset line 334 so that error integrator 320 will not be reset while the sampling operation is proceeding. When the integrator sample single shot 326 relaxes, error integrator reset single shot 336 is energized and the error integrator 320 is reset. Error integrator 320 will be held in reset by ΔTE and RDT. The registration delay time RDT and error time $\Delta TE$ are combined in OR gate 338 to form $\Delta TD$. The output of OR gate 338 is applied to inverter 340 to provide $\overline{\Delta TD}$. The output of single shot 336 and $\overline{\Delta TD}$ are combined in OR gate 342, the output thereof combined with the $\overline{Q}$ output of single shot 326 in AND gate 344 to produce the error integrator reset signal on line 334. When $\Delta TD$ is low, the error integrator reset signal 334 is high, and the error integrator is then clamped reset. The function of the integrator reset single shot 336 is to ensure that the error integrator 320 is reset before the error computation is started. Otherwise, if the registration delay time approaches the totality of a frame, there would be no time for the integrator to be reset before the next error calculation is to occur. The next error calculation actually starts when RDT goes true, and this opens up the error integrator reset switch SR so that the current from $\Delta V$ through resistor 325 is integrated when $\Delta TD$ becomes true.

In summary, a cycle of operation proceeds as follows:

Initially, both NAND flip-flops 300 and 302 are reset and the single-shots 326 and 336 are relaxed. The error integrator reset signal on lead 334 is high; $V_{EH}$ is steady at the level established by the previous error calculation cycle. Assuming no registration delay in the first instance, the first event is the arrival of a film pulse if the film is running fast or of a paper pulse if the film is running slow. In either instance, one of the NAND flip-flops is set and its corresponding analog switch closes. Also $\Delta TE$ rises, which forces $\overline{\Delta TD}$ low and the signal on lead 334 low; the error integrator proceeds to make the $\Delta TE \cdot V_0$ computation. When the later of the two registration pulses arrives, the second flip-flop sets and the error integrator computation stops, having equal input currents from both $+V_0$ and $-V_0$. When both flip-flops set, the integrator sample single shot 326 is triggered. This causes both flip-flops to reset after approximately 1 microsecond; the delay being required to guarantee that the input signal to the single shot stays long enough to complete the triggering. The triggering of single shot 326 also closes the switch between error integrator 320 and capacitor 333 via its Q output, the new error calculation thereby being applied to the synchronizer output. About a microsecond after single shot 326 completes its cycle, the integrator reset single shot 336 fires, which shorts out capacitor 332 by closing switch SR, sending $V_{EI}$ to zero. The error integrator 320 remains clamped after the cycling of the reset single shot 336 since neither $\Delta TE$, the Q output of single shot 336 nor RDT (registration delay time) are true. The cycle of operation is complete. When a registration delay is present, the clamp on the error integrator 320 is removed as soon as RDT becomes true. This allows the error integrator to a current proportional to the previous $\Delta V$ computation via resistor 325.

If a registration delay time is zero, the error $\Delta TE$ is detected and $V_{SO}$ changed immediately, the next frame is in correct position and $V_{SO}$ returns to normal. When the registration delay time is long (i.e., almost a full frame), no correction is made for a frame since the registration delay is cycling. By the time the first error calculation is finished and $V_{SO}$ changed, the registration delay circuit may be cycling again with an indication of film position which will indicate just as much error as the first error calculation. However, at the end of the second calculation cycle when the film is in the correct position, $V_{SO}$ must go back to its former value, i.e., the second error calculation must total zero. The $\Delta TD \cdot \Delta V$ integration does this.

Referring now to FIG. 4D, the signal $V_F$, from the zoom pot assembly, is carried through amplifiers 400 and 402 to form $V_{SO}$. If $\Delta V$ and $V_{EL}$ are zero, the zoom pot signal goes directly to $V_{SO}$ unmodified and the film transport runs at nominal speed. The synchronizer modifies $V_{FI}$ to make corrections on this nominal film speed. $V_{EH}$ is brought into amplifier 404 which functions as a divider; the latch signals causing the appropriate switches S1 . . . S7 on the feedback circuit of amplifier 404 to close. As the paper period becomes longer, the gain of amplifier 404 decreases as a longer time is available to compensate for a given position error. The percent of speed change required to make the correction is correspondingly decreased. $\Delta V$ is then summed with $V_O$ in amplifier 402 to form $V_{SO}$ to provide a frame-to-frame correction. $\Delta V$ is integrated by amplifier 406 so that $V_O$ becomes an accurate representation as to what the film transport speed should be, i.e., corrects for system errors as set forth hereinabove. Integrator 406 is essentially a very high gain bandwidth limited amplifier and provides gain to compensate for any system errors and ensures that $\Delta V$ will eventually be driven to zero. (i.e. the forward integrator 126 described with reference to FIG. 1.)

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Apparatus for reducing the phase difference between first and second periodic signals to substantially zero, comprising:

means for initially comparing the phase between said first and second periodic signals, the signal output of said comparing means representing the phase difference between said first and second periodic signals, means for integrating the output of said comparing means, the magnitude of the output of said integrating means representing said phase difference, means coupled to said integrating means for generating an output signal, said generated output signal being of a magnitude and polarity to reduce said phase difference to substantially zero, means responsive to the output signal from said output signal generating means for modifying the phase of said second periodic signal whereby said phase difference is reduced towards substantially zero, and means coupled to said integrating means for adjusting the output thereof if said phase difference output signal has not been reduced to substantially zero by said modifying means at the time a succeeding phase difference output signal is to be generated, said succeeding phase difference output signal being compensated for the modification of the phase of said second periodic signal during the time period said succeeding phase difference output signal is to be generated.

2. The apparatus as defined in claim 1 further including means for determining the period of said first periodic signal, said determining means being connected to said generating means whereby said phase difference is reduced to substantially zero within the period of said first periodic signal.

3. The apparatus as defined in claim 2 wherein said generating means comprises divider means.

4. Apparatus for printing prerecorded information comprising:

a filmstrip bearing said prerecorded information and first uniformly spaced sense markings distributed along the length thereof, a web bearing second uniformly spaced sense markings distributed along the length thereof, filmstrip driving means mechanically coupled to the said filmstrip for driving said filmstrip at a controllable velocity, web driving means mechanically coupled to said web for driving said web at a constant velocity, first detecting means fixedly disposed relative to said filmstrip for detecting the passage of each of said first uniformly spaced sense markings through a predetermined position and for generating a first periodic signal in response to each detected sense marking whereby the frequency of said generated signals is representative of the velocity of said filmstrip, second detecting means fixedly disposed relative to said web for detecting the passage of each of said second uniformly spaced sense markings through a second predetermined position and for generating a second periodic signal in response to each detected sense marking, the frequency of said generated signals being representative of the velocity of said web, means coupled to said first detecting means for delaying said first periodic signal, comparison means coupled to said delaying means and said second detecting means for generating signals indicative of the initial phase error between said first periodic signal and said delayed second periodic signal, means coupled to said comparison means for producing an output signal which is related to said phase error, means coupled to said producing means for generating a control signal, means responsive to said control signal for driving said filmstrip driving means whereby said phase error is reduced towards substantially zero, and means coupled to said producing means for modifying the output of said control signal generating means if said phase error signal has not been reduced to substantially zero by said filmstrip driving means at the time a succeeding phase error signal is to be generated, the succeeding signal indicative of phase error being compensated for the initial phase error correction being made by said driving means during the time period said succeeding phase error signal is to be generated.

5. The apparatus as defined in claim 4 further including means coupled to said second detecting means for generating a signal representing the period of said web in accordance with the sense markings detected on said web, the output of said generating means being connected to said control signal generating means.

6. The apparatus as defined in claim 5 wherein said generating means comprises divider means and wherein said control signal represents the correction necessary to reduce the phase error to substantially zero in said filmstrip period.

7. Apparatus for reducing the phase difference between first and second periodic signals to substantially zero comprising:

an integrator having input and output terminals, means responsive to the occurrence of a pulse in said first periodic signal for enabling said integrator to integrate a first signal applied to its input terminal, means responsive to the occurrence of a pulse in said second periodic signal for applying a second input signal to said integrator input, the magnitude of said second signal being equal to the magnitude of said first signal but opposite in polarity, the output signal of said integrator representing the phase difference between said first and second periodic signals.

means for generating a control signal, means for coupling the output of said integrator to said control signal generating means, means responsive to said control signal for modifying the phase of said first periodic signal whereby said phase difference is reduced towards substantially zero, and means for coupling the output of said control signal generating means to said integrator input for a period of time between the occurrence of a pulse in a third periodic signal and the pulse in said second periodic signal said integrator output being adjusted if said phase difference signal has not been reduced to substantially zero by said modifying means at the time a succeeding phase difference signal is to be generated, whereby the succeeding phase difference signal is compensated for the modifications of the phase of said first periodic signal during the time period said succeeding phase difference output signal is generated.

8. The apparatus as defined in claim 7 wherein said control signal generating means comprises divider means and further including means for determining the period of said second periodic signal, the output of said determining means being coupled to said divider means whereby said phase difference is reduced to substantially zero within the period of said second periodic signal.

9. A method for reducing the phase difference between first and second periodic signals to substantially zero, comprising the steps of:

initially comparing the phase between said first and second periodic signals and generating a signal output representing the phase difference between said first and second periodic signals, integrating said signal output, the magnitude of the integrated signal output representing said phase difference, generating an output signal in response to said integrated signal output, said generated output signal being of a magnitude and polarity to reduce said phase difference to substantially zero, modifying the phase of said second periodic signal in response to said generated output signal whereby said phase difference is reduced towards substantially zero, and adjusting said integrated signal output if said phase difference output signal has not been reduced to substantially zero at the time a succeeding phase difference output signal is to be generated, whereby succeeding phase difference output signal is compensated for the modification of the phase of said second periodic signal during the time period said succeeding phase difference output signal is to be generated.

10. The method as defined in claim 9 further including the step of generating a signal representing the period of said first periodic signal and modifying said generated output signal in response thereto whereby said phase difference is reduced to substantially zero within the period of said first periodic signal.

11. A method for printing prerecorded information from a filmstrip bearing said prerecorded information and first uniformly spaced sense markings distributed along the length thereon onto a web bearing second uniformly spaced sense markings distributed along the length thereof comprising the steps of:

driving said filmstrip at a controllable velocity, driving said web at a constant velocity, detecting the passage of each of said first uniformly spaced sense markings through a predetermined position and for generating a first periodic signal in response to each detected sense marking whereby the frequency of said generated signals is representative of the velocity of said filmstrip, detecting the passage of each of said second uniformly spaced sense markings through a second predetermined position and for generating a second periodic signal in response to each detected sense marking, the frequency of said generated signals being representative of the velocity of said web, delaying said first periodic signal, generating signals indicative of the initial phase error between said first periodic signal and said delayed second periodic signal, producing an output signal which is related to said phase error, generating a control signal, driving said filmstrip in response to said control signal whereby said phase is reduced towards substantially zero, and modifying said control signal if said phase error output signal has not been reduced to substantially zero at the time a succeeding phase difference output signal is to be generated, whereby the succeeding signal indicative of phase error is compensated for the initial phase error correction being made by said driving means during the time period said succeeding phase error signal is to be generated.

12. The method as defined in claim 11 further including the steps of generating a signal representing the period of said web in accordance with the sense markings detected on said web to modify said generated control signal, said modified control signal representing the correction necessary to reduce the phase error to substantially zero in said filmstrip period.

13. Apparatus for reducing the phase difference between first and second periodic signals to substantially zero within the period of said first periodic signal comprising:

means for initially comparing the phase between said first and second periodic signals, the signal output of said comparing means representing the phase difference between said first and second periodic signals, means for integrating the output of said comparing means, the magnitude of the output of said integrating means representing phase difference, means coupled to said integrating means for generating an output signal, said generated output signal being a magnitude and polarity to reduce said phase difference to substantially zero, means responsive to the output signal from said output signal generating means for modifying the phase of said second periodic signal whereby said phase difference is reduced to substantially zero, and means for determining the period of said first periodic signal, said determining means being connected to said generating means whereby said phase difference is reduced to substantially zero within the period of said first periodic signal.

14. The apparatus as defined in claim 13 wherein said generating means comprises divider means.

15. A method of reducing the phase difference between first and second periodic signals to substantially zero within the period of said first periodic signal comprising the steps of:

initially comparing the phase between said first and second periodic signals and generating a signal output representing the phase difference between said first and second periodic signals, integrating said signal output, the magnitude of the integrated signal output representing said phase difference, generating an output signal in response to said integrated signal output, said generated output signal being of a magnitude and polarity to reduce said phase difference to substantially zero, modifying the phase of said second periodic signal in response to said generated output signal whereby said phase difference is reduced to substantially zero, and generating a signal representing the period of said first periodic signal and modifying said generated output signal in response thereto whereby said phase difference is reduced to substantially zero within the period of said first periodic signal.

16. The apparatus as defined in claim 1 wherein said adjusting means provides a signal which is proportional to the phase modification performed during the time between when said second periodic signal is compared with said first periodic signal and the generation of said succeeding phase difference signal.

17. The apparatus as defined in claim 4 wherein said modifying means provides a signal which is proportional to the phase error correction performed during the time between the generation of said first periodic signal and the generation of said succeeding phase error signal.

* * * * *

UNITED STATES PATENT AND TRADEMARK OFFICE

CERTIFICATE OF CORRECTION

PATENT NO. : 3,917,400

DATED : November 4, 1975

INVENTOR(S) : Victor Rodek et al

It is certified that error appears in the above–identified patent and that said Letters Patent are hereby corrected as shown below:

In column 18, line 8, before "phase" insert -- said --.

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*